W. D. FORSYTH.
CAR TRUCK SIDE FRAME.
APPLICATION FILED DEC. 4, 1913.
1,125,295.
Patented Jan. 19, 1915.
2 SHEETS—SHEET 1.
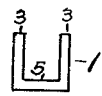 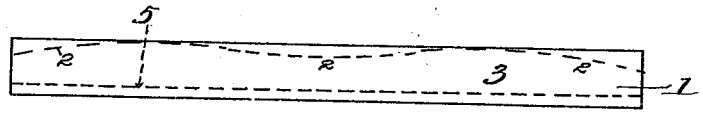
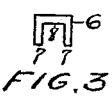 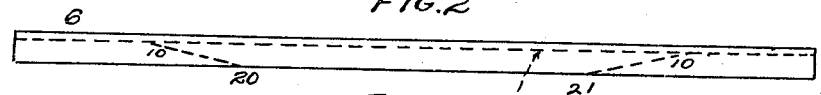
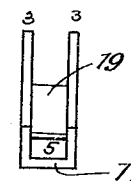 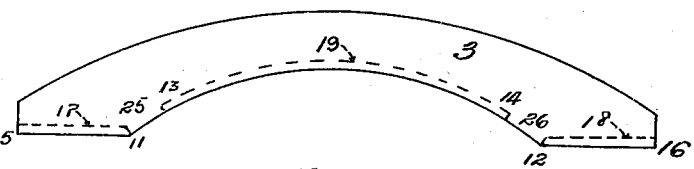
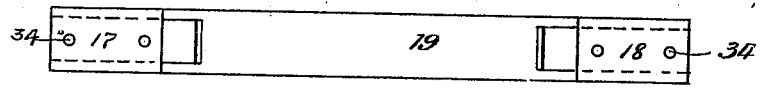
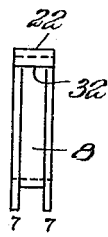 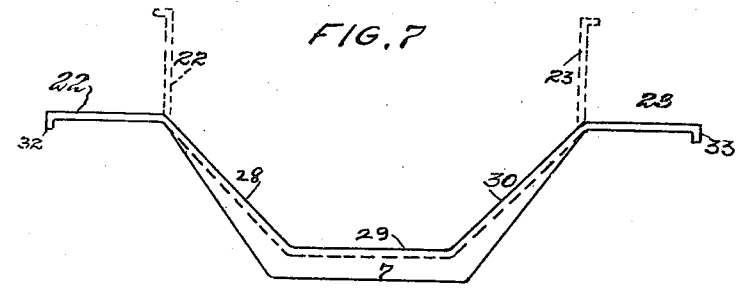
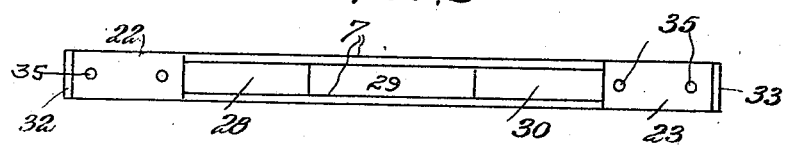
WITNESSES
INVENTOR
WILLIAM D. FORSYTH W. D. FORSYTH.
CAR TRUCK SIDE FRAME.
APPLICATION FILED DEC. 4, 1913.
1,125,295.
Patented Jan. 19, 1915.
2 SHEETS—SHEET 2.
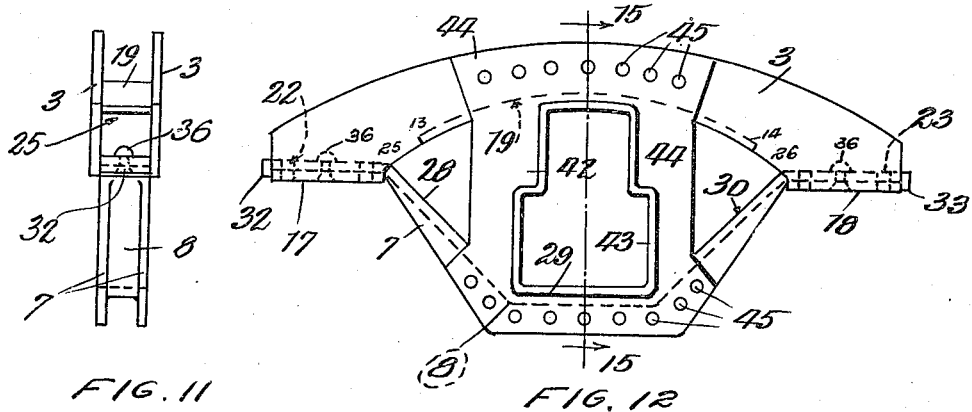
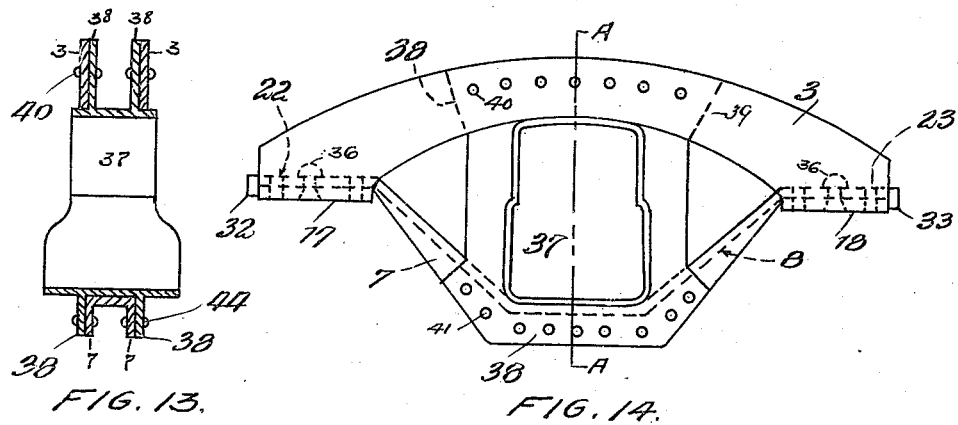
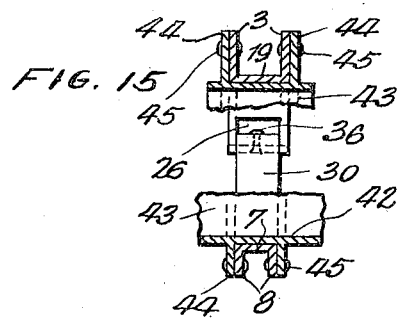
WITNESSES
J. F. Callahan
Ashley H. Brockett
INVENTOR
WILLIAM. D. FORSYTH
By A. M. Neeper
Attorney

UNITED STATES PATENT OFFICE.

WILLIAM D. FORSYTH, OF YOUNGSTOWN, OHIO, ASSIGNOR TO RAILWAY PRODUCTS CORPORATION, OF BUFFALO, NEW YORK, A CORPORATION OF NEW YORK.

CAR-TRUCK SIDE FRAME.

1,125,295.  Specification of Letters Patent.  Patented Jan. 19, 1915.

Application filed December 4, 1913. Serial No. 804,678.

*To all whom it may concern:*

Be it known that I, WILLIAM D. FORSYTH, a citizen of the United States, residing at Youngstown, in the county of Mahoning and State of Ohio, have invented new and useful Improvements in Car-Truck Side Frames, of which the following is a specification.

This invention relates to car truck side frames made from commercial structural shapes.

The principal object of this invention is to provide a car truck side frame made from ordinary commercial structural shapes.

This invention, among other things, consists of a car truck side frame wherein the compression and tension members are made of metal structural shapes in ordinary use, which are connected to each other by an open frame which constitutes the bolster guide bars.

In the accompanying drawings forming part of this specification, Figure 1 represents an end view of the structural shape from which the compression member is preferably made; Fig. 2 is a side view of Fig. 1, with dotted lines showing the shearing of the flanges and the thickness of the web of the shape shown in Fig. 1; Fig. 3 is a structural shape from which the tension member is preferably made; Fig. 4 is a side view of Fig. 3, with dotted lines showing the shearing of its flanges and the thickness of its web; Fig. 5 is an end view of the shape shown in Fig. 1 and Fig. 2 after the same has been formed into the compression member; Fig. 6 is a side view of Fig. 5; Fig. 7 is a bottom plan view of Fig. 6; Fig. 8 is an end view of Fig. 9; Fig. 9 is a side view of Fig. 4, after the shape shown therein has been sheared and shaped; Fig. 10 is a bottom plan view of Fig. 9; Fig. 11 is an end view of the side frame; Fig. 12 is a side view of the same; Fig. 13 is a section of Fig. 14 on line A—A; Fig. 14 is a side view of the truck frame showing a modified construction with the open frame forming the bolster guide bars in position; Fig. 15 is a section on the line 15—15 on Fig. 12.

In the drawings, like reference characters refer to like parts throughout the several views.

In the car truck side frame shown, the upper or compression member is made from a channel 1. The edges of the flanges 3 of the channel 1 are partly cut away to make said flanges 3 widest at points near their ends and comparatively narrow at their ends and at their middles, as indicated by the dotted lines 2 in Fig. 2. The web 5 of the channel 1 is cut out to form an opening 25 and an opening 26 near each end, as shown in Fig. 6; and this leaves the end portions 17 and 18 of the web 5 at each end of the channel between the points 15 and 11, and 12 and 16 respectively, integral with the flanges 3, and a middle portion 19 between the points 13 and 14 also integral with the flanges 3. The middle portion 19 of the web 5 between the end portions 17 and 18 is arched up, with the result that the outer edges of the flanges 3 are curved, as shown in Fig. 6.

The lower or tension member of the side frame is made from a channel 6 having flanges 7 and web 8. The flanges 7 are cut off at each end of the channel 6 along the web 8 from its ends a short distance to a point indicated by the numeral 10, leaving end portions 22 and 23 of the web 8, and then along oblique lines indicated by the dotted lines between the points 10 and 20, and 10 and 21. The middle part of the channel 6 between the points 10 and 10 is displaced relative to the plane of the end portions 22 and 23 of the web 8, as shown in Fig. 9, to form a straight middle portion 29 lying in a plane parallel to the plane of said end portions 22 and 23, and two diverging portions 28 and 30. The end portions 22 and 23 of the web 8 are bent up so as to be substantially parallel with each other, as indicated by the dotted lines in Fig. 9, and the extreme ends 32 and 33 of the end portions 22 and 23 are bent down at right angles to said end portions 22 and 23.

The end portions 22 and 23 of the channel 6 are passed through the openings 25 and 26 in the web 5 of the channel 1, and are bent down into contact with the end portions 17 and 18 of said web 5. The ends 32 and 33 of said end portions 22 and 23 engage over the end edges of said end portions 17 and 18. The end portions 22 and 23 of the channel 6 are preferably fastened to the end portions 17 and 18 of the channel 1 by bolts or rivets 36. In the end portions 17 and 18 of the channel 1 are holes 34 and in the end portions 22 and 23 of the channel 6 are holes 35 and through these holes pass the bolts which fasten the journal boxes to the side frame.

The side frame is completed by mounting an open frame 42, having sides 43 which act as bolster guide bars, between the channel 1 and the channel 6. The frame 42 may be cast or made from a structural shape or a metal plate. The frame 42 has two spaced fins 44 which straddle the channel 1 and the channel 6, and which are fastened by rivets 45 to the flanges 3 and the flanges 7 thereof respectively.

In the modified form of construction shown in Figs. 13 and 14, the web 5 of the channel 1 between the end portions 17 and 18 thereof is entirely removed. An open frame 37 is fastened to the channel 1 and the channel 6. The flanges 38 at the top of said open frame 37 engage the inside faces of the flanges 3 of the channel 1; and at the bottom of said open frame 37, said flanges 38 engage the outside faces of the flanges 7 of the channel 6. Otherwise the construction shown in Figs. 13 and 14 is the same as in the preferred form.

The channels 1 and 6 may be rolled commercial structural shapes, or they may be cut and bent from plates. The ends 32 and 33 of the end portions 22 and 23 of the web 8 of the channel 6 hook over the end edges of the end portions 17 and 18 of the web 5 of the channel 1 and strengthen the connection between the channel 1 and the channel 6.

The constructions shown and described herein may be considerably modified without departing from the invention, and I do not wish to be limited to the details of such constructions.

What I claim as my invention is:

1. A car truck side frame comprising a compression member and a tension member, each consisting of a channel, the web of the channel constituting said compression member being cut away between its end portions, the flanges of the channel constituting said tension member being cut away at its end portions, the end portions of the tension member being superimposed upon the end portions of the compression member and being fastened thereto.

2. A car truck side frame comprising a compression member consisting of a channel whose web is cut away between the end portions thereof, a tension member consisting of a channel whose flanges are cut away from the end portions thereof, the end portions of said tension member being superimposed upon the end portions of said compression member, the ends of said tension member being bent over the end edges of said compression member.

3. A car truck side frame comprising a compression member consisting of a channel whose web is cut away between the end portions thereof, and whose flanges have their middle portions displaced from the plane of said end portions in a direction perpendicular to said plane of said end portions, and a separate tension member whose end portions are fastened to the end portions of said compression member.

4. A car truck side frame comprising a tension member consisting of a channel whose flanges are cut away from the end portions thereof, and whose middle portion is displaced from the plane of said end portions in a direction perpendicular to said plane of said end portions, the ends of said end portions being bent along transverse lines at right angles thereto.

In witness whereof I have hereunto subscribed my name in the presence of two subscribing witnesses.

WILLIAM D. FORSYTH.

Witnesses:
M. E. THOMAS,
J. F. CALLAHAN.

Copies of this patent may be obtained for five cents each, by addressing the "Commissioner of Patents, Washington, D. C."